United States Patent [19]

Chen et al.

[11] Patent Number: 4,615,997

[45] Date of Patent: Oct. 7, 1986

[54] METHOD FOR PREPARING HYDROISOMERIZATION CATALYSTS

[75] Inventors: Nai Y. Chen, Titusville, N.J.; Sharon B. McCullen, Newtown, Pa.; Stephen M. Oleck, Moorestown, N.J.

[73] Assignee: Mobil Oil Corporation, New York, N.Y.

[21] Appl. No.: 740,690

[22] Filed: Jun. 3, 1985

[51] Int. Cl.$^4$ ............................................. B01J 29/06
[52] U.S. Cl. ....................................... 502/66; 502/64; 502/74
[58] Field of Search ............................. 502/66, 74, 71

[56] References Cited

U.S. PATENT DOCUMENTS

| Re. 28,341 | 2/1975 | Wadlinger et al. | 208/120 |
| 3,691,255 | 9/1972 | Takase et al. | 502/66 X |
| 3,986,982 | 10/1976 | Crowson et al. | 252/415 |
| 4,016,218 | 4/1977 | Haag et al. | 260/671 R |
| 4,188,282 | 2/1980 | Tabak | 208/134 |
| 4,312,790 | 1/1982 | Butter et al. | 252/455 Z |
| 4,444,895 | 4/1984 | Fung et al. | 502/37 |
| 4,518,708 | 5/1985 | Krishnamurthy et al. | 502/74 X |
| 4,539,305 | 9/1985 | Wilson et al. | 502/66 |

*Primary Examiner*—Carl F. Dees
*Attorney, Agent, or Firm*—Alexander J. McKillop; Michael G. Gilman; Dennis P. Santini

[57] ABSTRACT

A method for preparing hydroisomerization zeolite catalysts containing a highly dispersed noble metal is described. The method includes mix mulling the zeolite, noble metal and binder into an extrudate and chemically treating the formed particles in order to achieve a high dispersion of noble metal on the catalyst.

19 Claims, 3 Drawing Figures

METHOD FOR PREPARING HYDROISOMERIZATION CATALYSTS

CROSS-REFERENCE TO RELATED APPLICATIONS

U.S. patent application Ser. No. 647,594, filed Sept. 6, 1984 now abandoned, is directed to the preparation of highly dispersed noble metal-containing zeolite catalysts.

BACKGROUND OF THE INVENTION

1. Field of the Invention

This invention relates to a process for preparing a noble metal-containing catalyst. More particularly, this invention relates to a process for preparing zeolite catalysts containing a highly dispersed noble metal in the form of small crystallites.

2. Discussion of Prior Art

Shape-selective catalysis utilizing molecular sieves was first demonstrated by P. B. Weisz and V. J. Frilette in *J. Phys. Chem.*, 64, page 302 (1960). Since then, the shape-selective catalytic properties of various zeolites have been extensively demonstrated. For example, N. Y. Chen and W. E. Garwood, in "Some Catalytic Properties of ZSM-5, a New Shape Selective Zeolite", *Journal of Catalysis*, 52, pages 453–458 (1978), described the shape-selectivity of ZSM-5. On the other hand, the use of zeolites as shape-selective supports for catalytic functions has received much less attention.

P. B. Weisz, V. J. Frilette, R. W. Maatman and F. B. Mower, in "Catalysis by Crystalline Aluminosilicates II. Molecular-Shape Reactions", *Journal of Catalysis*, 1, pages 307–312 (1962), described a shape-selective olefin hydrogenation catalyst comprising platinum incorporated in zeolite A. In U.S. Pat. No. 3,140,322 to V. J. Frilette and P. B. Weisz, a process is disclosed for hydrogenation using a platinum-containing zeolite. In U.S. Pat. No. 3,226,339 of V. J. Frilette and R. W. Maatman, a process is described for the preparation of a platinum- or palladium-containing zeolite catalyst. U.S. Pat. No. 3,575,045 to J. N. Miale discloses the use of a platinum-entrained zeolite A for selective hydrogenation.

A catalyst and process for selectively hydrogenating ethylene in the presence of propylene utilizing a zeolite in conjunction with a hydrogenation metal is disclosed in U.S. Pat. No. 3,496,246. N. Y. Chen and P. B. Weisz, in "Molecular Engineering of Shape-Selective Catalysts", *Kinetics and Catalysis, Chem. Eng. Prog. Symp.*, Ser. No. 73, Vol. 63, 1967, page 86, describes a platinum catalyzed hydrogenation employing a phosphine-poisoned, platinum-exchanged sodium mordenite zeolite.

An excellent summary of the art of metal loaded zeolite catalysts and shape-selective catalysis is given in *Zeolite Chemistry and Catalysts*, J. A. Rabo, Ed., ACS Monograph 171 (1976). Of particular interest is Chapter 10, "Catalytic Properties of Metal-Containing Zeolites" by K. M. Minachev and Y. I. Isakov, and Chapter 12, "Shape-Selective Catalysis" by S. M. Csicsery.

Catalysts, such as ZSM-5, combined with a Group VIII metal are described in U.S. Pat. No. 3,856,872 to Morrison. It is disclosed in this patent that the catalysts be preferably incorporated in a porous matrix, such as alumina. A Group VIII (hydrogenation) metal may then be added after incorporation with the zeolite in a matrix by such means as base-exchange or impregnation. In one embodiment, the metal is added in the form of chloroplatinic acid.

U.S. Pat. No. 4,188,282 discloses particularly preferred forms of noble metal-containing zeolites, such as ZSM-5, formed by the crystallization of the zeolite from a forming solution containing noble metal ions, such as those of platinum. U.S. Pat. No. 3,462,377 to Plank et al discloses the preparation of metal-containing zeolite catalysts in which the activity of the catalyst is enhanced by steaming.

British Pat. No. 1,189,850 discloses the preparation of a noble metal containing zeolite catalyst in which a metal loaded ammonium zeolite, which has been manufactured by contacting zeolite material with ammonia and/or ammonium ions and which has been composited with one or more hydrogenation metals, is subjected to controlled oxidative calcination.

The introduction of noble metals by ion-exchange methods, such as those described in U.S. Pat. No. 3,856,872 and British Pat. No. 1,189,850, can result in serious losses of the noble metal being exchanged because of the excess amounts of noble metal-containing solution required. The co-crystallization method of U.S. Pat. No. 4,188,282 not only results in significant losses of noble metals, but requires extensive modifications to the zeolite production process.

One method for reducing the volume of noble metal solution is to add the noble metal directly to the zeolite in the mulling step, i.e., by physically intimately mixing the noble metal with the zeolite, during the catalyst synthesis process.

U.S. Pat. No. 4,312,790 to Butter et al discloses a method of preparing a noble metal-containing catalyst by incorporating a noble metal in a cationic form with a zeolite after crystallization of said zeolite, but prior to the final catalyst particle formation. The zeolite is calcined only after extrusion, i.e., after addition of the noble metal. Such catalysts have been found to be an improvement over those catalysts wherein the metal is incorporated during zeolite crystallization, or after extrusion. The catalyst thus produced also exhibits little hydrogenation-dehydrogenation activity.

There are methods known in the prior art for the redispersion of metals on deactivated catalysts. For example, U.S. Pat. Nos. 3,134,732, 3,986,982 and 4,444,895 teach the reactivation or regeneration of a metal-containing catalyst by treating the catalyst with a halide and/or halogen gas during the treatment process. However, heretofore, there has not been any disclosure or suggestion of an efficient and economical process for preparing a highly-dispersed metal-containing hydroisomerization zeolite catalyst, such as that disclosed in the present invention.

OBJECTS OF THE INVENTION

Accordingly, it is an object of the present invention to produce a catalyst by the muller method, having the advantage of high noble-metal dispersion.

It is another object of the present invention to overcome the deficiencies of the prior art.

It is still another object of the present invention to prepare a noble-metal containing zeolite catalyst which is particularly useful in low pressure hydroisomerization processes.

These and other objects are fulfilled by the present invention, which is disclosed below.

SUMMARY OF THE INVENTION

The present invention is directed to a method for preparing a highly dispersed noble metal-containing zeolite hydroisomerization catalyst, which comprises:

(a) incorporating a noble metal in anionic or cationic form with a zeolite having a Constraint Index less than 2 by physical intimate mixing;

(b) calcining the zeolite in nitrogen at 450°-540° C. for about 2 hours;

(c) steaming the zeolite in air containing 0.5 to 1.0 atmospheres (atm) $H_2O$ at a temperature ranging from about 450° to 540° C.; and (d) contacting the zeolite with a stream of inert gas containing about 0.001 to 10 wt % chlorine at temperatures ranging from about 250° to 550° C.

The invention is further directed to a method for preparing a highly dispersed noble metal-containing zeolite hydroisomerization catalyst in which the zeolite catalyst has a Constraint Index not more than 2, which comprises:

(a) physically intimately contacting a noble metal in anionic or cationic form with the zeolite, a binder and water;

(b) extruding the product of step (a);

(c) drying the product of step (b) at a temperature of about 130° C.;

(d) calcining the zeolite in nitrogen at a temperature from 450°-540° C. for about 2 hours;

(e) steaming the product of step (c) in air containing 0.5 to 1.0 atmospheres (atm) $H_2O$ at a temperature ranging from about 450° to 540° C.;

(f) reducing in hydrogen; and (g) contacting the product of step (e) with a stream of inert gas containing about 0.001 to 10 wt % chlorine at temperatures ranging from about 250° to 550° C.

DESCRIPTION OF PREFERRED EMBODIMENTS

Figure 1:
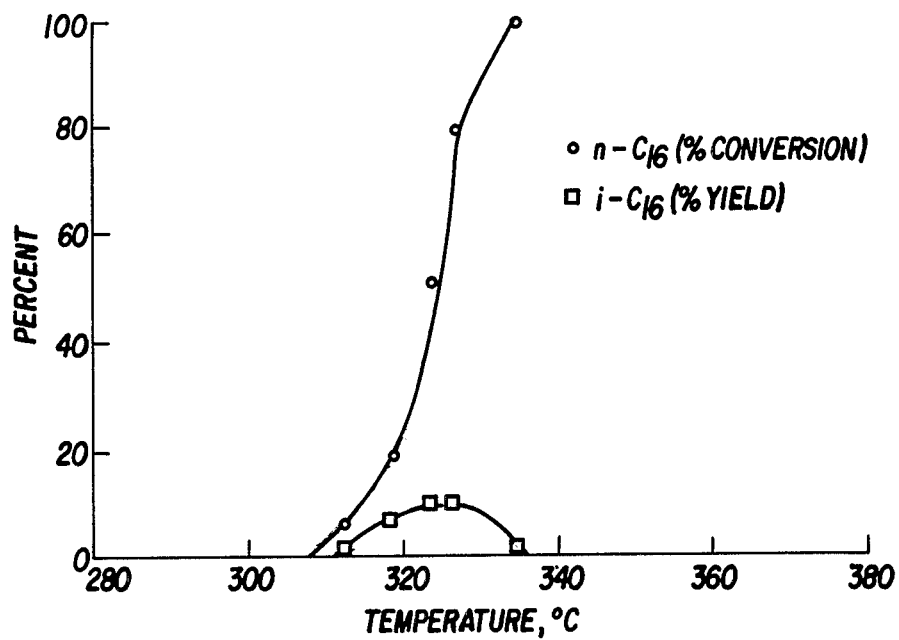
FIG. 1 is a graph comparing % $n-C_{16}$ conversion and % $i-C_{16}$ yield at different temperatures for the catalyst of Example 1.

Catalysts produced by the process of the present invention are specifically directed to hydroisomerization catalysts, and particularly low pressure hydroisomerization catalysts.

Hydroisomerization

Hydroisomerization of n-paraffins is an important reaction in many refining processes. In naphtha reforming, n-paraffins are isomerized to increase the naphtha octane number. Isomerization of n-paraffins in higher boiling petroleum fractions, e.g., distillate and lube boiling range fractions, will improve physical properties such as pour point or cloud point. For example, a 40°-70° C. decrease in melting point occurs with a single methyl branch at the 3 through 7 position of $C_9-C_{15}$ alkanes, compared to the straight-chain analogs. Isomerization also affects the boiling point, but to a lesser extent, i.e., on the order of 20° C.

On the other hand, hydrocracking of paraffins can also be used to lower pour point. In contrast to isomerization, in hydrocracking, the paraffin molecule cracks to two or more molecules which contain a lesser number of carbon atoms than the original molecule. These lower molecular weight products have lower melting points and lower boiling points. These differences in isomerization and hydrocracking become important, for example, in pour point reduction of a distillate cut.

If paraffin isomerization is the major reaction pathway, the pour point will be lowered with high distillate yield; however, in hydrocracking, the pour point is lowered at the sacrifice of distillate yield. $Pt/SiO_2-Al_2O_3$ and Pt/Mordenite are some commonly used isomerization catalysts, as disclosed by A. P. Bolton in *Zeolite Chemistry and Catalysis* (J. A. Rabo, Ed.), ACS Monograph 171, page 739, American Chemical Society, Washington, DC, 1976, and J. Weitkamp, *Ind. Eng. Prod. Res. Dev.*, 1982, 21, pages 550–558.

Paraffin isomerization by metal-containing zeolite catalysts has been shown to occur by the following bifunctional mechanism, as disclosed by P. B. Weisz in *Advances in Catalysis* (D. D. Eley, H. Pines, and P. B. Weisz, Ed.), Vol. 13, page 137, Academic Press, New York, 1963:

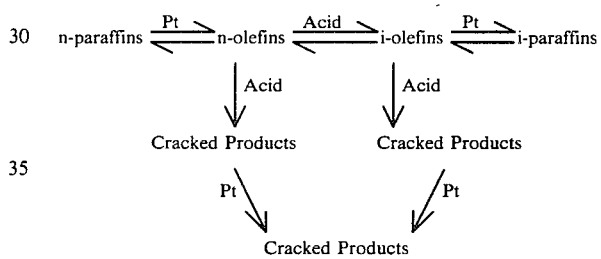

For maximum isomerization selectivity, high metal surface area, low acidity and the close proximity of metal and acid sites are required. The metal-acid site proximity requirement can be explained by the above equation. The reaction involves a series of steps where n-paraffin is dehydrogenated by Pt to form an n-olefin. The n-olefin then moves to the acid site where isomerization occurs to product i-olefin. At this point, the isomerization selectivity is determined by the proximity of the metal sites to the acid sites. The rate of isomerization at the acid site is generally higher than the rate of cracking; therefore the isomerization selectivity is determined by the rate of iso-olefin diffusion to the metal site. According to the Einstein diffusion equation, if the ratio of iso-olefin diffusion rate D ($cm^2/sec$) to the square of the metal-acid site separation (cm) is much greater than the rate of cracking, then the isomerization selectivity will be high. However, if the reverse is true, then the isomerization selectivity will be low.

Catalysts

The present invention provides a catalyst having excellent hydroisomerization activity. It is believed that the close relationship between zeolite acidity and the metal sites causes the catalyst to function as an excellent isomerization catalyst. By incorporating the steps of steaming the zeolite after the metal has been added, followed by chlorinating the catalyst, the proper metal-acid proximity sites are met.

The catalysts produced by the novel method of the present invention comprise a member or members of crystalline silicate zeolites, as defined herein, a noble metal and a binder. In practicing the method of the present invention, the noble metal is physically, intimately admixed with the zeolite subsequent to zeolite crystallization, but prior to extrusion (final catalyst particle formation). Such metal incorporation can be accomplished either before or after addition of a binder, e.g., mulling with alumina; but, in any event, before extrusion.

The preferred catalysts for this invention are zeolite-type catalysts and, most preferably, large pore zeolites having a Constraint Index less than 2, as described hereinafter. For purposes of this invention, the term "zeolite" is meant to represent the class of porotectosilicates, i.e., porous crystalline silicates, that contain silicon and oxygen atoms as the major components. Other components may be present in minor amounts, usually less than 14 mole %, and preferably less than 4 mole %. These components include aluminum, gallium, iron, boron and the like, with aluminum being preferred, and used herein for illustrative purposes. The minor components may be present separately or in mixtures.

The silica-to-alumina mole ratio referred to may be determined by conventional analysis. This ratio is meant to represent, as closely as possible, the ratio in the rigid anionic framework of the zeolite crystal and to exclude aluminum in the binder or in cationic or other forms within the channels. Although zeolites with a silica-to-alumina ratio of at least 10 are useful, it is preferred to use zeolites having much higher silica-to-alumina mole ratios, i.e., ratios of at least 150:1. In addition, zeolites, as otherwise characterized herein but which are substantially free of aluminum, i.e., having silica-to-alumina mole ratios up to and including infinity, are found to be useful and even preferable in some instances. The novel class of zeolites, after activation, acquire an intra-crystalline sorption affinity for normal hexane, which is greater than that for water, i.e., they exhibit "hydrophobic" properties.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index. The method by which Constraint Index is determined is described fully in U.S. Pat. No. 4,016,218, to which reference is made for details of the method.

Constraint Index (CI) values for some typical large pore materials are:

|  | CI |
| --- | --- |
| ZSM-4 | 0.5 |
| ZSM-20 | 0.5 |
| TEA Mordenite | 0.4 |
| Mordenite | 0.5 |
| REY | 0.4 |
| Amorphous Silica-Alumina | 0.6 |
| Dealuminized Y (Deal Y) | 0.5 |
| Chlorinated Alumina | *1 |
| Zeolite Beta | 0.6-1+ |

*Less Than

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables, such as crystal size of the zeolite, the presence of occluded contaminants, etc., may affect the Constraint Index. Therefore, it will be appreciated that it may be possible to so select test conditions as to establish more than one value for the Constraint Index of a particular zeolite. This explains the range of Constraint Indices for Zeolite Beta.

Zeolite ZSM-4 is taught by U.S. Pat. No. 3,923,639, the disclosure of which is incorporated herein by reference.

Zeolite ZSM-20 is taught by U.S. Pat. No. 3,972,983, the disclosure of which is incorporated herein by reference.

Zeolite Beta is taught by U.S. Pat. Nos. 3,308,069 and U.S. Pat. No. Re. 28,341, the disclosures of which are incorporated herein by reference.

Low sodium Ultrastable Y molecular sieve (USY) is described in U.S. Pat. Nos. 3,293,192 and 3,449,070, the disclosures of which are incorporated herein by reference.

The acidic component of the zeolite is preferably a porous crystalline zeolite. The crystalline zeolite catalysts used in the catalyst comprise a three-dimensinal lattice of $SiO_4$ tetrahedra, cross-linked by the sharing of oxygen atoms and which may optionally contain other atoms in the lattice, especially aluminum in the form of $AlO_4$ tetrahedra; the zeolite will also include a sufficient cationic complement to balance the negative charge on the lattice. Acidic functionality may, of course, be varied by artifices including base exchange, steaming or control of silica:alumina ratio.

The original cations associated with each of the crystalline silicate zeolites utilized herein may be replaced by a wide variety of other cations, according to techniques well known in the art. Typical replacing cations include hydrogen, ammonium, alkyl ammonium and metal cations, including mixtures of the same. Of the replacing metal cations, particular preference is given to cations of metals such as rare earth metals and manganese, as well as metals of Group IIA and B of the Periodic Table, e.g., zinc, and Group VIII of the Periodic Table, e.g., nickel, platinum and palladium.

As is the case of many catalysts, it is desired to incorporate the zeolite with another material resistant to the temperatures and other conditions employed in organic conversion processes. Such materials include active and inactive materials as well as inorganic materials, such as clays, silica and/or metal oxides. Inactive materials suitably serve as diluents to control the amount of conversion in a given process so that products can be obtained economically without employing other means for controlling rate of reaction. Binders useful for compositing with the useful zeolite herein also include inorganic oxides, notably alumina, which is particularly preferred.

In addition to the foregoing material, the zeolite catalyst can be composited with a porous matrix material, such as silica-alumina, silica-magnesia, silica-zirconia, silica-thoria, silica-beryllia, silica-titania, as well as ternary compositions such as silica-alumina-thoria, silica-alumina-zironica, silica-alumina-magnesia and silicaalumina-zirconia. The relative proportions of the finely divided crystalline zeolite and inorganic oxide matrix may vary widely, with the zeolite content ranging from about 1 to about 90 wt %, and more usually in the range of about 50 to about 80 wt % of the composite.

The zeolites preferred in the present invention are large pore zeolites, i.e., those zeolites having a Constraint Index less than 2. Large pore zeolites are well known to the art and have a pore size sufficiently large to admit the vast majority of components normally found in a feed chargestock. The zeolites are generally stated to have a pore size in excess of 7 Angstroms and are represented by, e.g., Zeolite Y, Ultrastable Y (USY), Dealuminized Y (Deal Y), Mordenite, faujasite, ZSM-3, ZSM-4, ZSM-18, ZSM-20 and amorphous aluminosilicate. An exceptionally suitable large pore material is Zeolite Beta. It is to be noted that Zeolite Beta is structurally distinguished from large pore zeolites and behaves differently from either large pore zeolites or intermediate pore zeolites. Preferably, Zeolite Beta has a $SiO_2/Al_2O_3$ ratio of 120:1 or greater.

Noble metals which are incorporated within the zeolite by the present invention include a metal or metals of Groups IB, IIB, VA, VIA or VIIIA of the Periodic Table (IUPAC and U.S. National Bureau of Standards approved Table, as shown, for example, in the Chart of the Fisher Scientific Company, Catalog No. 5-702-10). The preferred hydrogenation components are the noble metals of Group VIIIA, especially platinum, but other noble metals, such as palladium, osmium, ruthenium or rhodium may also be used. Combinations of noble metals, such as platinum-palladium, together with combinations with non-noble metals, particularly of Groups IB, IVB, VIIA and VIIA are of interest.

The metal may be dispersed with the catalyst or otherwise combined by physical intimate mixing or mulling with the catalyst in any desired manner known to the art, such as in a ball mill, pelletizer, jet mill, muller mixer or the like. The metal may be incorporated in the form of a cationic or anionic complex, and cationic complexes of this type will be found convenient for exchanging metals onto the zeolite. Anionic complexes are also useful for impregnating metals into the zeolites. The noble metal content is in the range of 0.01 to 10 wt %, and preferably 0.3 to 3 wt %.

Preparation Procedures

A preferred procedure for preparing a typical noble metal-containing zeolite catalyst composited with an inorganic oxide binder according to the present invention would comprise the following steps:

(1) Preparing the zeolite by known procedures;
(2) Mulling the as-synthesized zeolite with a noble metal source, a binder and enough water to form an extrudable mass;
(3) Extruding to form catalyst pellets, followed by drying, preferably in air at a temperature of about 130° C.;
(4) Calcining in nitrogen at a temperature of 450°–540° C. for about 2 hours;
(5) Steaming in 0.5 to 1.0 atm water in air at a temperature of 450° to 540° C.;
(6) Reducing in hydrogen; and
(7) Treating at 250° to 510° C. using a stream of inert gas containing 0.001 to 10 wt % chlorine ($Cl_2$) in an inert gas stream until $Cl_2$ appears at the reactor outlet.

As stated previously, the noble metal component is physically, intimately admixed with the zeolite in the form of either cationic or anionic noble metal species or their salts. In the case of the preferred metal platinum, suitable cationic compounds include platinous chloride and various compounds containing platinum amine or amine complexes.

A wide variety of metallic compounds can be employed with facility as a source of metallic cations and include both inorganic and organic salts of the noble metals. Representative of the salts which can be employed are nitrates and chlorides. The only limitation is that the salt be a sufficiently soluble form in the fluid medium.

Conventional methods for adding noble metal to the zeolite materials used in the present invention, e.g., excess solution ion-exchange methods, do not permit very good control of metal loading. Furthermore, methods such as co-crystallization of the noble metal during zeolite formation may require significant modification of zeolite manufacturing facilities. However, the addition of noble metals during mulling of the zeolite with the inorganic oxide binder is achieved with no substantial modification of conventional process equipment. By the present invention, zeolitic catalysts of high noble metal dispersion and reduced noble metal crystallite size can be readily prepared.

Preferred conditions in the reducing step are the use of hydrogen as the reducing gas, in a reducing atmosphere comprising essentially hydrogen, at a volume concentration of 0.05 to 5 vol % and a pressure of about 14.7 to 400 psig, and an inert gas carrier such as nitrogen or helium, particularly preferred at a temperature of about 300° to 500° C.

An an optional step following the reducing step, the catalyst may be subjected to halide treatment with a halide-providing compound. By the term "halide-providing", is meant a compound containing ionically or covalently bound halogen which, under the process conditions, can release the halogen in halide form to the catalyst surface. The hydrogen halides can be hydrogen fluoride, hydrogen chloride, hydrogen bromide, or hydrogen iodide. Preferably, hydrogen chloride is the halide-providing compound used in the process. The atmosphere contacting the catalyst in this step can contain other inert gases, e.g., nitrogen and the like. The temperature of the halide treatment is generally conducted in the range of about 250° to 510° C., and preferably about 375° to 475° C., and the halide-providing compound, at the above-identified temperature, is contacted with the catalyst in a gaseous stream until the halide appears at the reactor outlet. The catalyst is treated to a range of about 0.001 to 10 wt % halide, and preferably 0.01 to 1.0 wt %.

The catalyst is then subjected to a halogen redispersion step by contacting the catalyst with a stream comprising elemental halogen gas. Elemental halogen gases, which are applicable, include fluorine, chlorine, bromine and iodine, with chlorine being a preferred embodiment. The halogen redispersion step is carried out at a temperature of about 250° to 510° C., and preferably about 375° to 475° C., until halogen breakthrough. By the term "breakthrough", is meant the first visible detection by an analytical method.

The catalyst is then reduced in hydrogen at temperatures of about 250° to 500° C.

The process of the present invention provides a zeolite catalyst containing a highly dispersed noble metal, while avoiding the problems of the prior art catalyst preparation processes. It is important to note that the steaming step occurs after the noble metal has been added to the zeolite, not before as is the case in most prior art inventions. Steaming after noble metal addition allows the noble metal to bind to the zeolite during the chlorination step. Thus, the criticality of the combination of steaming and chlorinating distinguish the present invention from those in the prior art.

The following examples will serve to illustrate the invention without limiting the same.

EXAMPLE 1

A Zeolite Beta ($SiO_2/Al_2O_3=40:1$) catalyst was prepared by mulling 100 grams of low sodium as-synthesized Zeolite Beta (dry basis) with 1.22 grams platinum, as $Pt(NH_3)_4(NO_3)_2$ solution, and 100 grams alumina (Kaiser alpha-alumina monohydrate). The mulled mixture was extruded to 1/16" diameter cylinders, dried at 130° C. and then air-calcined at 500° C. The hydroisomerization activity and selectivity was determined using a feed which contained 89.1% n-$C_{16}$, 10% 1-methylnaphthalene, 0.57% dibenzothiophene and 0.25% dibenzoquinolene. The results are illustrated on FIG. 1, which shows a plot of n-$C_{16}$ conversion and i-$C_{16}$ yield versus temperature.

EXAMPLE 2

Figure 2:
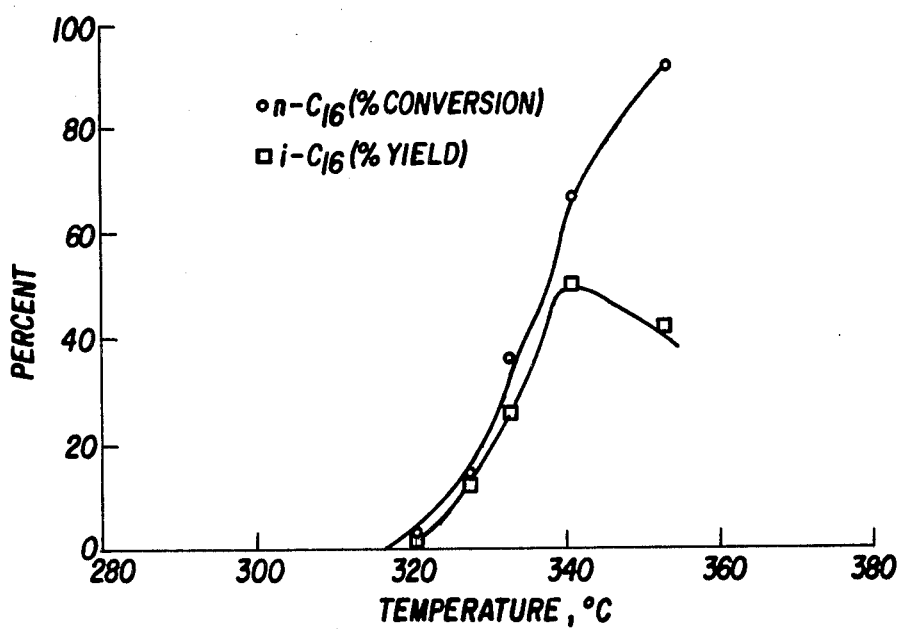
FIG. 2 is a graph comparing % $n-C_{16}$ conversion and % $i-C_{16}$ yield at different temperatures for the catalyst of Example 2.

A Pt/Zeolite Beta extrudate was prepared as described in Example 1. After drying, the extrudate was steamed at 540° C., 0.9 atm water (g) and 0.1 atm air for 16 hours. Following reduction, hydrogen chloride in nitrogen was introduced to the steam extrudate at 450° C., 20 torr hydrogen chloride for 2 hours. The catalyst was then treated with 10 torr chlorine in nitrogen at 450° C. for 4 hours, followed by reduction at 450° C. The hydroisomerization activity and selectivity was examined using the same feed as in Example 1. FIG. 2 illustrates the n-$C_{16}$ conversion and i-$C_{16}$ yield for the catalyst of Example 2. As shown in FIG. 2, a large increase in the i-$C_{16}$ yield was observed while the catalyst was approximately 10° C. less active for n-$C_{16}$ conversion, in comparison to that shown in Example 1. Thus, a higher isomerization selectivity is observed in the catalyst of Example 2 than in the catalyst of Example 1. Because high isomerization selectivity is desired, the catalyst in Example 2 was found to be superior to that in Example 1. Without wishing to be confined to one theory, it is nevertheless believed that the superiority of the catalyst of Example 2 is a result of the combination of intimate mulling, steaming and halogen treatment.

EXAMPLE 3

Example 3 illustrates a catalyst preparation procedure in which $Al_2O_3$ is not steamed. A Zeolite Beta ($SiO_2/Al_2O_3=40:1$) catalyst was prepared by calcination at 500° C. in $N_2$ for 2 hours, then steamed at 540° C., 0.9 atm $H_2O$ (g) and 0.1 atm air for 10 hours. 100 grams of steamed Zeolite Beta was then mulled with 100 grams alumina (Kaiser alpha-alumina monohydrate) and 1.22 grams platinum as $Pt(NH_3)_4(NO_3)_2$. The mulled mixture was extruded to 1/16" diameter cylinders, dried at 130° C. and air-calcined at 500° C. The isomerization activity and selectivity was examined using the same feed as in Example 1. The hydroisomerization activity and selectivity are similar to that shown in FIG. 1.

EXAMPLE 4

Figure 3:
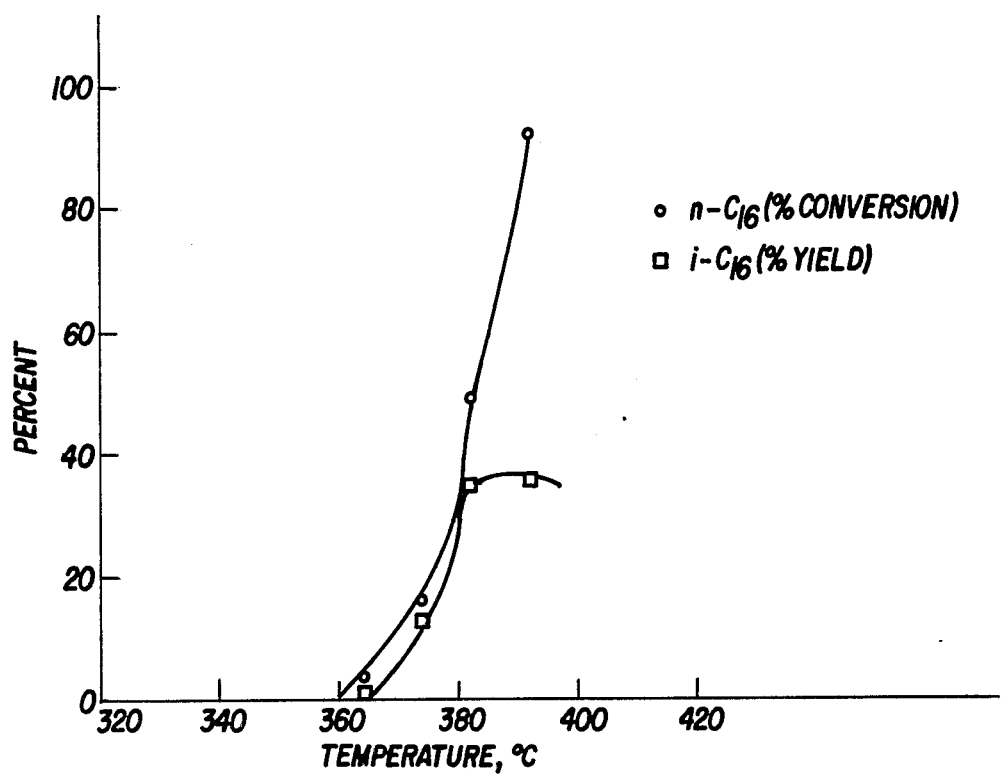
FIG. 3 is a graph comparing % $n-C_{16}$ conversion and % $i-C_{16}$ yield at different temperatures for the catalyst of Example 4.

Example 4 illustrates the chlorine treatment of the catalyst prepared in Example 3. The Pt/Zeolite Beta-/$Al_2O_3$ extrudate was prepared as described in Example 3. The catalyst was then treated with 10 torr chlorine in nitrogen at 450° C. for 4 hours, followed by reduction at 450° C. Using the feed described in Example 1, the hydroisomerization activity and selectivity was examined. As shown in FIG. 3, the catalyst of Example 2 is significantly more active and selective for isomerization than Example 4.

EXAMPLE 5

Example 5 illustrates the optional use of hydrogen chloride. The Pt/Zeolite Beta/$Al_2O_3$ extrudate was prepared as described in Example 3. Following reduction, hydrogen chloride in nitrogen was introduced to the extrudate at 450° C., 20 torr hydrogen chloride for 2 hours. The catalyst was then treated with 10 torr chlorine in nitrogen at 450° C. for 4 hours, followed by reduction at 450° C. This catalyst has isomerization activity and selectivity similar to that shown in FIG. 3.

The examples show the criticality of how a combination of steaming the Pt/Zeolite Beta/$Al_2O_3$ extrudate and chlorine treatment results in a catalyst with superior isomerization activity and selectivity. Omitting the steam or chlorine treatments results in a catalyst with poor isomerization selectivity. It can be shown that steaming of the Pt/Zeolite Beta/$Al_2O_3$ extrudate decreases the affinity of $Al_2O_3$ for platinum during chlorine treatment. The platinum can then be directed to the zeolite during chlorine treatment so as to satisfy the acid-metal site proximity requirement.

Although the invention has been described in conjunction with specific embodiments, it is evident that many alternations and variations will be apparent to those skilled in the art in light of the foregoing description. Accordingly, the invention is intended to embrace all of the alternatives and variations that fall within the spirit and scope of the appended claims.

We claim:

1. A method for preparing a highly dispersed noble metal-containing hydroisomerization catalyst comprising a zeolite having a Constraint Index less than 2 and a binder, said method comprising:
    (a) incorporating at least one noble metal in anionic or cationic form with said zeolite and binder by physical intimate mixing;
    (b) calcining the product of step (a) in air containing from 0.5 to 1.0 atm $H_2O$ at a temperature ranging from about 450° to 540° C.; and
    (c) contacting the product of step (b) with a stream of inert gas containing about 0.001 to 10 wt % chlorine at temperatures ranging from about 250° to 550° C.

2. The method of claim 1, wherein said at least one noble metal is selected from any of Groups IB, IVB, VIIA or VIII of the Periodic Table of Elements.

3. The method of claim 1, wherein said at least one noble metal is selected from the group consisting of platinum, palladium, osmium, rhenium and ruthenium.

4. The method of claim 1, wherein the noble metal content of said at least one noble metal ranges from between about 0.01 to about 10 wt %.

5. The method of claim 1, wherein the noble metal content of said at least one noble metal ranges from between about 0.3 to about 3 wt %.

6. The method of claim 1, wherein said binder is an inorganic oxide binder selected from the group consisting of alumina, silica, silica-alumina, magnesia, titania and zirconia.

7. The method of claim 1, wherein said zeolite is selected from the group consisting of Zeolite Y, Ultrastable Y, Dealuminized Y, Mordenite, faujasite, ZSM-3, ZSM-4, ZSM-18 and ZSM-20.

8. The method of claim 1, wherein said zeolite is Zeolite Beta.

9. The method of claim 8, wherein said Zeolite Beta has a $SiO_2/Al_2O_3$ ratio of at least 120:1.

10. The method of claim 1, further comprising, after step (b) and prior to step (c), contacting product of step (b) with a stream of inert gas containing about 0.001 to 10 wt % chloride at temperatures ranging from about 25° to 550° C.

11. The method according to claim 10, wherein said chloride is hydrochloric acid.

12. A method for preparing a highly dispersed noble metal-containing hydroisomerization zeolite catalyst, said zeolite catalyst comprising a zeolite having a Constraint Index not more than 2 and a binder, which comprises:
 (a) physically, intimately contacting at least one noble metal in anionic or cationic form with said zeolite and binder and water;
 (b) extruding the product of step (a);
 (c) drying the product of step (b) at a temperature of about 130° C.;
 (d) calcining the combination of said zeolite, said binder and said at least one noble metal in air containing from 0.5 to 1.0 atm $H_2O$ at a temperature ranging from about 450° to 540° C.;
 (e) reducing the product of step (d) in hydrogen; and;
 (f) contacting the product of step (e) with a stream of inert gas containing about 0.001 to 10 wt % chlorine at temperatures ranging from about 250° to 550° C.

13. The method of claim 12, wherein said at least one noble metal is selected from any of Groups IB, IVB, VIIA or VIII of the Periodic Table of Elements.

14. The method of claim 12, wherein said at least one noble metal is selected from the group consisting of platinum, palladium, osmium, rhenium and ruthenium.

15. The method of claim 12, wherein the noble metal content of said at least one noble metal ranges from between about 0.01 to about 10 wt %.

16. The method of claim 12, wherein the noble metal content of said at least one noble metal ranges from between about 0.3 to about 3 wt %.

17. The method of claim 12, wherein said binder is an inorganic oxide binder selected from the group consisting of alumina, silica, silica-alumina, magnesia, titania and zirconia.

18. The method of claim 12, wherein said zeolite is selected from the group consisting of Zeolite Y, Ultrastable Y, Dealuminized Y, Mordenite, faujasite, ZSM-3, ZSM-4, ZSM-18 and ZXM-20.

19. The method of claim 12, wherein said zeolite is Zeolite Beta.

* * * * *